(12) United States Patent
Khan et al.

(10) Patent No.: US 8,077,793 B2
(45) Date of Patent: Dec. 13, 2011

(54) SYSTEM AND METHOD FOR SPACE-FREQUENCY RATE CONTROL IN A MIMO WIRELESS COMMUNICATION NETWORK

(75) Inventors: Farooq Khan, Allen, TX (US); Cornelius van Rensburg, Dallas, TX (US); Jiann-An Tsai, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 716 days.

(21) Appl. No.: 11/775,602

(22) Filed: Jul. 10, 2007

(65) Prior Publication Data
US 2008/0037679 A1 Feb. 14, 2008

Related U.S. Application Data

(60) Provisional application No. 60/836,830, filed on Aug. 10, 2006.

(51) Int. Cl.
*H04B 7/02* (2006.01)
*H04W 4/00* (2009.01)
*G06F 15/177* (2006.01)

(52) U.S. Cl. .......... 375/267; 455/434; 709/220
(58) Field of Classification Search .......... None
See application file for complete search history.

(56) References Cited

U.S. PATENT DOCUMENTS

| | | | |
|---|---|---|---|
| 2004/0170430 A1* | 9/2004 | Gorokhov | 398/41 |
| 2005/0120097 A1* | 6/2005 | Walton et al. | 709/220 |
| 2005/0215251 A1* | 9/2005 | Krishnan et al. | 455/434 |
| 2006/0105813 A1* | 5/2006 | Nakao | 455/562.1 |

* cited by examiner

*Primary Examiner* — David C. Payne
*Assistant Examiner* — Sarah Hassan (57) ABSTRACT

A base station that communicates with subscriber stations in an OFDM wireless network. The base station transmits a first data stream and a second data stream to a subscriber station using a first virtual antenna and a second virtual antenna. The base station allocates first data symbols associated with the first data stream to be transmitted from the first virtual antenna in a first selected group of subbands of OFDM subcarriers and allocates second data symbols associated with the first data stream to be transmitted from the second virtual antenna in a second selected group of subbands of OFDM subcarriers.

24 Claims, 10 Drawing Sheets

SYSTEM AND METHOD FOR SPACE-FREQUENCY RATE CONTROL IN A MIMO WIRELESS COMMUNICATION NETWORK

CROSS-REFERENCE TO RELATED APPLICATIONS AND CLAIMS OF PRIORITY

The present application is related to U.S. Provisional Patent No. 60/836,830, filed Aug. 10, 2006, entitled "Space Frequency Rate Control In A Single-User MIMO Wireless Communication System". U.S. Provisional Patent No. 60/836,830 is assigned to the assignee of this application and is hereby incorporated by reference into the present application as if fully set forth herein. The present application hereby claims priority under 35 U.S.C. §119(e) to U.S. Provisional Patent No. 60/836,830.

The present application is also related to U.S. patent application Ser. No. 11/389,708, entitled System And Method For Subcarrier Allocation In A Multicarrier Wireless Network, filed on Mar. 27, 2006. U.S. patent application Ser. No. 11/389,708 is assigned to the assignee of this application and is hereby incorporated by reference into the present application as if fully set forth herein.

TECHNICAL FIELD OF THE INVENTION

The present application relates generally to wireless communications and, more specifically, to apparatuses and methods for allocating space-frequency resources on a subband basis in a multicarrier wireless network.

BACKGROUND OF THE INVENTION

Conventional orthogonal frequency division multiplexing (OFDM) networks and orthogonal frequency division multiple access (OFDMA) network are able to improve the reliability of the channel by spreading and/or coding data traffic and control signals over multiple orthogonal subcarriers (i.e., tones). Different user devices (i.e., subscriber stations, mobile stations, etc.) are allocated different sets of subcarriers (or tones) for transmitting and receiving data and control signals. The subcarrier frequencies are orthogonal to each other, thereby minimizing interference between user devices.

OFDM/OFDMA techniques are particularly advantageous in multiple-input, multiple output (MIMO) wireless networks that employ multiple antennas (i.e., Smart antennas) to transmit OFDM signals to the user devices. MIMO transmission schemes use multiple transmit antennas and multiple receive antennas to improve the capacity and reliability of a wireless communication channel. A MIMO system provides a linear increase in capacity with the factor K, where K is the minimum of number of transmit (M) antennas and receive (N) antennas (i.e., K=min(M,N)).

For example, four different data streams may be transmitted separately from the four transmit antennas. The transmitted signals are received at the four receive antennas. Some form of spatial signal processing is performed on the received signals to recover the four transmitted data streams. An example of spatial signal processing is V-BLAST, which uses successive interference cancellation to recover the transmitted data streams. Other variants of MIMO systems include schemes that perform some kind of space-time coding across the transmit antennas (e.g., D-BLAST) and also beam-forming techniques, such as spatial division multiple access (SDMA).

Good channel estimation is important to the performance of a MIMO transmission scheme. MIMO channel estimation consists of estimating the channel gain and phase information for links from each of the transmit antennas to each of the receive antennas. The channel for an M×N MIMO system consists of an M×N matrix:

$$H = \begin{bmatrix} a_{11} & a_{12} & \ldots & a_{1N} \\ a_{21} & a_{22} & \ldots & a_{2N} \\ \vdots & \vdots & \ldots & \vdots \\ a_{M1} & a_{M2} & \ldots & a_{MN} \end{bmatrix} \quad \text{[Eqn. 1]}$$

where $a_{ij}$ represents the channel gain from transmit antenna i to receive antenna j. In order to enable the estimations of the elements of the MIMO channel matrix, separate pilots may be transmitted from each of the transmit antennas.

Spatial multiplexing MIMO schemes can generally be divided into two broad categories: i) single stream or single codeword (SCW) schemes, and ii) multiple streams or multiple codeword (MCW) schemes. In the case of a single stream (or single-code word) MIMO transmission, a cyclic redundancy check (CRC) value is added to a single information block and then coding and modulation is performed on the block. The coded and modulated symbols are then demultiplexed for transmission over multiple antennas or beams to a single receiving device (e.g., subscriber stations, mobile station).

In the case of a multiple stream (or multiple code word) MIMO transmission, the information block is demultiplexed into smaller information blocks. Individual CRC values are attached to each of these smaller information blocks and then separate coding and modulation is performed on each of the smaller information blocks. These smaller information blocks are then transmitted from separate MIMO antennas or beams to multiple receiving devices.

It should be noted that in multiple code word MIMO transmissions, different modulation techniques (e.g., BPSK, QPSK, 16-QAM) and coding techniques (e.g., turbo coding, convolutional coding) may be used on each of the individual streams, resulting in a so-called PARC (per antenna rate control) scheme. Also, multiple code word transmission allows for more efficient post-decoding interference cancellation, because a CRC check may be performed on each of the individual streams (or code words) before each stream (or code word) is cancelled from the overall signal. In this way, only correctly received streams or code words are cancelled, thereby avoiding interference propagation in the cancellation process.

In conventional OFDMA (or OFDM) wireless networks that use MIMO transmission techniques, a data stream or codeword is transmitted from the same antenna, beam or virtual antenna over all the subbands or subcarriers allocated to the receiving device (e.g., subscriber station). However, in a multipath frequency selective channel, different subbands fade differently, thereby resulting in signal variations within codeword symbols. This degrades the system performance and capacity.

Therefore, there is a need for improved OFDMA (or OFDM) transmission systems that are capable of transmitting a stream (or codeword) to a receiving device without suffering performance degradation related to different amounts of multipath frequency selective fading in different subbands.

SUMMARY OF THE INVENTION

In one embodiment of the present disclosure, a base station is provided for use in an orthogonal frequency division multiplexing (OFDM) network capable of communicating with a plurality of subscriber stations in a coverage area of the OFDM network. The base station is capable of transmitting to a first subscriber station, using a first virtual antenna and a second virtual antenna, a first data stream and a second data stream. The base station allocates first data symbols associated with the first data stream to be transmitted from the first virtual antenna in a first selected group of subbands of OFDM subcarriers and allocates second data symbols associated with the first data stream to be transmitted from the second virtual antenna in a second selected group of subbands of OFDM subcarriers.

In an advantageous embodiment, the base station allocates the first data symbols associated with the first data stream to be transmitted from the first virtual antenna in the first selected group of subbands based on channel quality characteristics of the first selected group of subbands.

The base station allocates the second data symbols associated with the first data stream to be transmitted from the second virtual antenna in the second selected group of subbands based on channel quality characteristics of the second selected group of subbands.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

In the exemplary embodiment described herein, the present disclosure is implemented in a wireless network in which multi-antenna base stations transmit to subscriber stations (i.e., user devices) according to an orthogonal frequency division multiplexing (OFDM) or orthogonal frequency division multiple access (OFDMA) protocol. The base station uses multiple-input, multiple-output (MIMO) antennas to implement spatial division multiplexing techniques. Unlike conventional MIMO implementations, the disclosed base station may transmit to the same subscriber station from multiple antennas using different subcarriers on different physical antennas, beams, or virtual antennas, depending on the fading of the subcarriers from each antenna.

Figure 1:
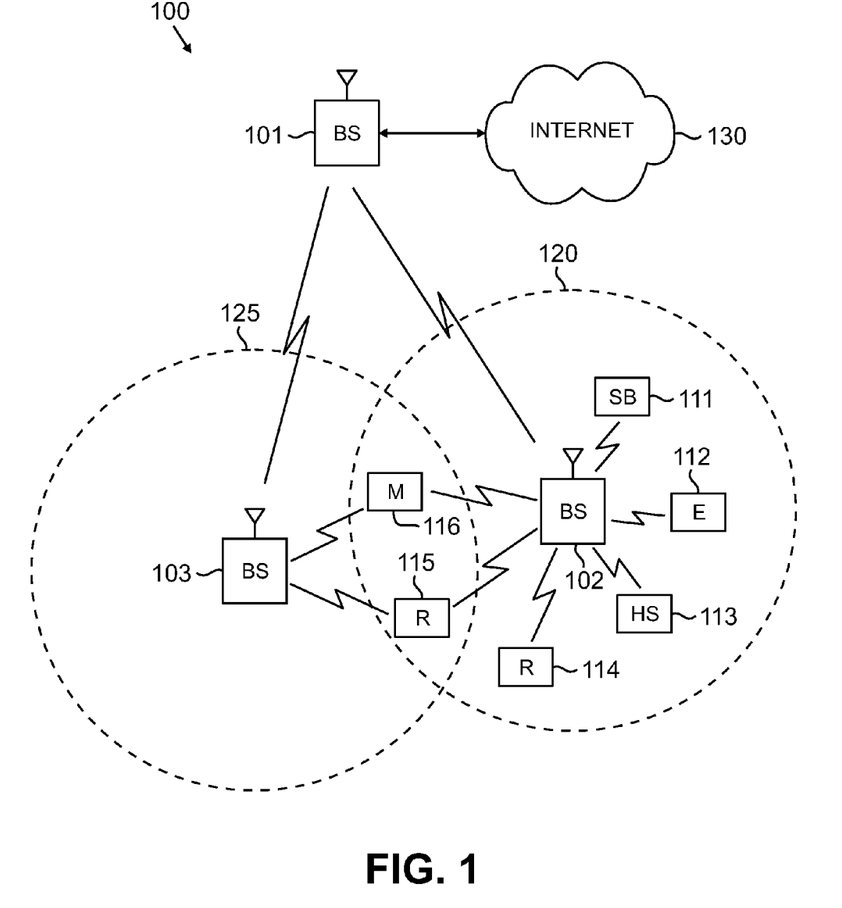
FIG. 1 illustrates an exemplary OFDMA wireless network that implements a MIMO transmission scheme and allocates space-frequency resources according to the principles of the present disclosure.

FIG. 1 illustrates exemplary orthogonal frequency division multiple access (OFDMA) wireless network 100, which implements a MIMO transmission scheme and allocates space-frequency resources according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

In an advantageous embodiment of the present disclosure, each one of base stations 101-103 uses multiple antennas to transmit data to each subscriber station in the downlink and to receive data from each subscriber stations in the uplink. According to the principles of the present disclosure, each one of base stations 101-103 is capable of transmitting data to a selected subscriber station using one group of subcarriers (or subband) on a first antenna and a different group of subcarriers (or subband) on a second antenna. For example, BS 102 may transmit downlink data to SS 116 from a first antenna (ANT1) using a first group of 64 subcarriers (i.e., Subband1) and may simultaneously transmit downlink data to SS 116 from a second antenna (ANT2) using a second group of 64 subcarriers (i.e., Subband2). At the same time, BS 102 may transmit downlink data to SS 115 from antenna ANT1 using Subband2 and may simultaneously transmit downlink data to SS 115 from antenna ANT2 using Subband1. Since the fading at the receiver from each antenna is independent of the other antennas, the allocation of subbands at each antenna is independent of the allocations of subbands at other antennas. Thus, the allocations of subbands are done on an antenna-by-antenna basis.

Figure 2A:
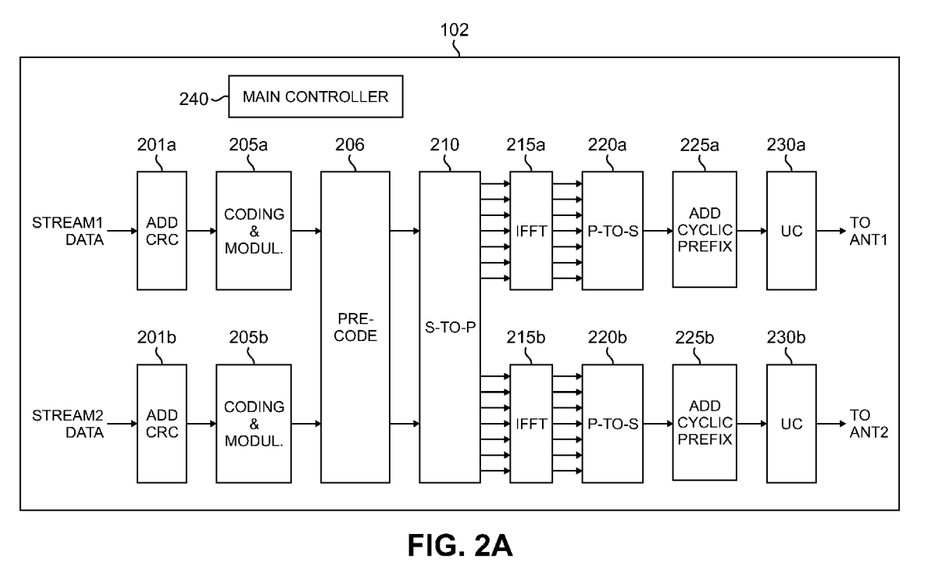
FIG. 2A is a high-level diagram of an orthogonal frequency division multiple access (OFDMA) transmit path in a base station that allocates space-frequency resources according to the principles of the present disclosure.
Figure 2B:
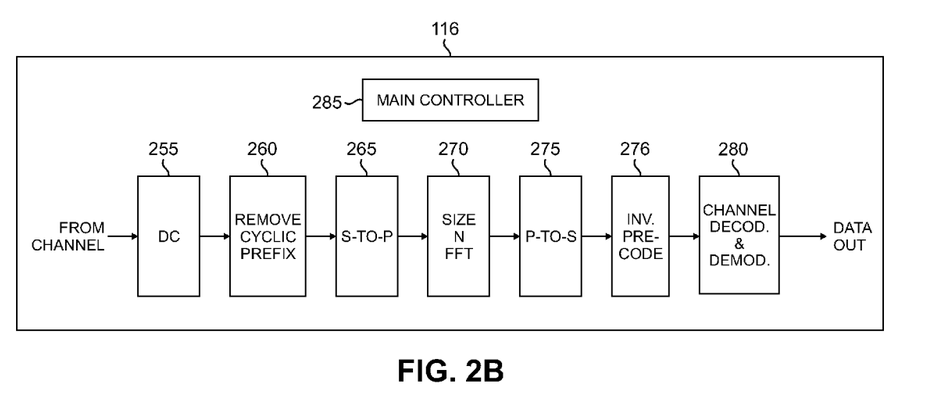
FIG. 2B is a high-level diagram of an orthogonal frequency division multiple access (OFDMA) receive path in a subscriber station according to an exemplary embodiment of the disclosure.

FIG. 2A is a high-level diagram of an orthogonal frequency division multiple access (OFDMA) transmit path in a base station that allocates space-frequency resources according to the principles of the present disclosure. FIG. 2B is a high-level diagram of an orthogonal frequency division multiple access (OFDMA) receive path in a subscriber station according to an exemplary embodiment of the present disclosure. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that a similar (though not identical) OFDMA receive path may also be implemented in BS 102 and a similar (though not identical) OFDMA transmit path may be implemented in SS 116.

For the purposes of simplicity and clarity, the embodiment in FIG. 2A illustrates two transmit paths that may send data in multi-user mode to, for example, two subscriber stations (e.g., SS 116 and SS 115) via two transmit antennas, ANT1 and ANT2 (not shown), or that may send data in single-user mode to one subscriber station (e.g., SS 116) via two transmit antennas, ANT1 and ANT2. However, this is by way of illustration only and should not be construed to limit the scope of the disclosure.

More generally, a base station according to the present disclosure may use N transmit antennas to transmit data to M subscriber stations using selective allocation of different groups of subcarriers to different transmit antennas. Moreover, the base station also may employ some form of pre-coding on the data streams before mapping of the data symbols to physical antennas, thus creating a set of beams or virtual antennas. The principles of the present disclosure in this case apply equally to the beams or virtual antennas as if they are physical antennas.

A first transmit path is directed to antenna ANT1 (not shown) and a second transmit path is directed to antenna ANT2 (not shown). The first transmit path comprises add cyclic redundancy check (CRC) block 201a, channel coding and modulation block 205a, optional pre-code block 206, serial-to-parallel (S-to-P) block 210, IFFT block 215a, parallel-to-serial (P-to-S) block 220a, add cyclic prefix (CP) block 225a, and up-converter (UC) block 230a. The second transmit path comprises add cyclic redundancy check (CRC) block 201b, channel coding and modulation block 205b, optional pre-code block 206, serial-to-parallel (S-to-P) block 210, IFFT block 215b, parallel-to-serial (P-to-S) block 220b, add cyclic prefix (CP) block 225b, up-converter (UC) block 230b.

Base station 102 further comprises main controller 204, which may be, for example, a microprocessor or a microcontroller. Main controller 204 controls the overall operation of BS 102, including the allocation of space-frequency resources and the adaptation of stream data rate according to the principles of the present disclosure.

The receive path in subscriber station (SS) 116 (or 115) comprises down-converter (DC) 255, remove cyclic prefix block 260, serial-to-parallel (S-to-P) block 265, Size N Fast Fourier Transform (FFT) block 270, parallel-to-serial (P-to-S) block 275, optional inverse pre-code block 276, channel decoding and demodulation block 280, and main controller 285. Main controller 285 controls the overall operation of SS 116, including the reporting of channel quality indicator (CQI) data to BS 102 according to the principles of the present disclosure.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms executed by a processor, where the value of Size N may be modified according to the implementation.

In BS 102, add CRC block 201a receives a first block of data, Stream1 Data, which may be transmitted to, for example, SS 116 via antennas ANT1 and ANT2 in single user mode, or to SS 116 or SS 115, or both, via antennas ANT1 and ANT2 in multi-user mode. Add CRC block 201a performs a cyclic redundancy check operation that adds a CRC value to the Stream1 Data block.

Channel coding and modulation block 205a receives input bits from add CRC block 201a, applies coding (e.g., turbo coding, convolutional coding), and modulates (e.g., BPSK, QPSK, QAM, etc.) the coded input bits to produce a sequence of frequency-domain modulation symbols. Optional pre-code block 210 performs a unitary pre-coding operation before mapping Stream1 Data to physical antennas.

If pre-coding is implemented in BS 102, the input symbols received by pre-code block 210 comprise a set of virtual antenna (VA) inputs before the pre-coding. As is well-known, a pre-coding operation spreads the virtual antenna input symbols across each of the physical transmit antennas (i.e., ANT1 and ANT2). As will be explained below in greater detail, each symbol in the Stream1 Data is potentially transmitted from all of the physical transmit antennas used in the superimposed information transmission.

Serial-to-parallel block 210 converts (i.e., de-multiplexes) the serial pre-coded symbols from pre-code block 210 to parallel data to produce N parallel symbol streams, where N is the IFFT/FFT size used in BS 102, SS 116, and SS 115. Size N IFFT block 215a performs an IFFT operation on the N parallel symbol streams to produce time-domain output signals. Parallel-to-serial block 220a converts (i.e., multiplexes) the parallel time-domain output symbols from Size N IFFT block 215a to produce a serial time-domain signal. Add cyclic prefix block 225a then inserts a cyclic prefix to the time-domain signal. Finally, up-converter 230a modulates (i.e., up-converts) the output of add cyclic prefix block 225a to RF frequency for transmission via antenna ANT1.

Similar operations occur in the second transmit path. Add CRC block 201b receives a first block of data, Stream2 Data, which may be transmitted to, for example, SS 116 via antennas ANT1 and ANT2 in single user mode, or to SS 116 or SS 115, or both, via antennas ANT1 and ANT2 in multi-user mode. Add CRC block 201b performs a cyclic redundancy check operation that adds a CRC value to the Stream2 Data block.

Channel coding and modulation block 205b receives input bits from add CRC block 201b and applies coding (e.g., turbo coding) and modulates (e.g., BPSK, QPSK, QAM, etc.) the input bits to produce a sequence of frequency-domain modulation symbols. Optional pre-code block 210 performs a unitary pre-coding operation before mapping Stream2 Data to physical antennas. Pre-code block 210 pre-codes the Stream2 Data symbols in a manner similar to the pre-coding of the Stream1 Data symbols described above.

Serial-to-parallel block 210 converts (i.e., de-multiplexes) the serial pre-coded symbols from pre-code block 206 to parallel data to produce N parallel symbol streams where N is the IFFT/FFT size used in BS 102, SS 116, and SS 115. Size N IFFT block 215b performs an IFFT operation on the N parallel symbol streams to produce time-domain output signals. Parallel-to-serial block 220b converts (i.e., multiplexes) the parallel time-domain output symbols from Size N IFFT block 215b to produce a serial time-domain signal. Add cyclic prefix block 225b then inserts a cyclic prefix to the time-domain signal. Finally, up-converter 230b modulates (i.e., up-converts) the output of add cyclic prefix block 225b to RF frequency for transmission via antenna ANT2.

The transmitted RF signals from antennas ANT1 and ANT2 arrive at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols.

Optional inverse pre-code block 276 reverses the pre-coding operation, if any, performed in BS 102 so that the symbol information spread across ANT1 and ANT2 is recovered. Channel decoding and demodulation block 280 demodulates and then decodes the modulated symbols to recover the original input data stream.

The transmit path and receive path components described herein and illustrated in FIGS. 2A and 2B are configurable devices that may be re-programmed and controlled by main controller 240 in BS 102 or main controller 285 in SS 116. Thus, for example, main controller 240 is operable to configure modulation block 205 to adapt to different modulation techniques (e.g., BPSK, QPSK, QAM, etc.). Similarly, main controller 285 is operable to similarly configure demodulation block 280. Main controllers 240 and 285 are also operable to modify the value of Size N.

Figure 3A:
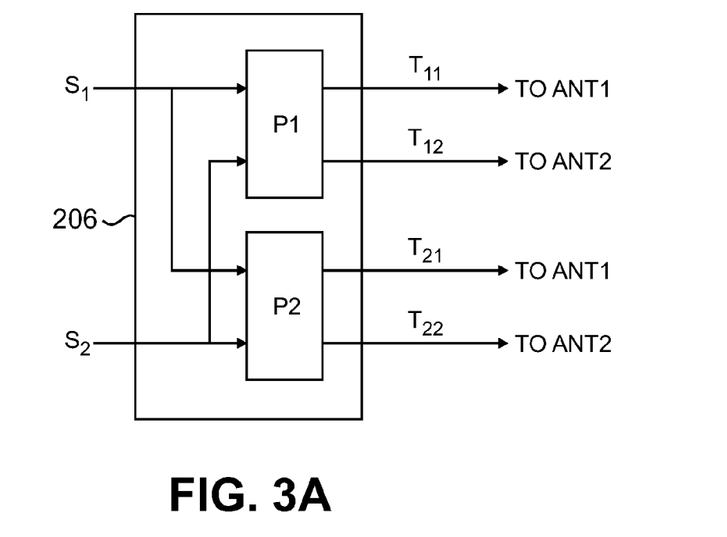
FIG. 3A illustrates a pre-code block in greater detail according to one embodiment of the disclosure.

FIG. 3A illustrates pre-code block 206 in greater detail according to one embodiment of the present disclosure. As stated above, optional pre-coding by pre-code block 206 may implement a unitary pre-coding scheme before mapping Stream1 Data and Stream2 Data to the physical antennas ATN1 and ANT1. For the case of two physical transmit antennas (ANT1 and ANT2), two unitary pre-coding matrices, $P_1$ and $P_2$, may be expressed as:

$$P_1 = \frac{1}{\sqrt{2}} \begin{bmatrix} 1 & 1 \\ 1 & -1 \end{bmatrix}, \quad \text{[Eqn. 2]}$$

$$P_2 = \frac{1}{\sqrt{2}} \begin{bmatrix} 1 & 1 \\ j & -j \end{bmatrix}.$$

Assuming modulation symbols $S_1$ and $S_2$ are transmitted at a given time from Stream1 Data and Stream2 Data, respectively, then the modulation symbols after the pre-coding operation with matrices $P_1$ and $P_2$ may be written as:

$$T_1 = P_1 \begin{bmatrix} S_1 \\ S_2 \end{bmatrix} = \frac{1}{\sqrt{2}} \begin{bmatrix} 1 & 1 \\ 1 & -1 \end{bmatrix} \times \begin{bmatrix} S_1 \\ S_2 \end{bmatrix} = \frac{1}{\sqrt{2}} \begin{bmatrix} S_1 + S_2 \\ S_1 - S_2 \end{bmatrix} \quad \text{[Eqn. 3]}$$

and $$T_2 = \quad \text{[Eqn. 4]}$$
$$P_2 \begin{bmatrix} S_1 \\ S_2 \end{bmatrix} = \frac{1}{\sqrt{2}} \begin{bmatrix} 1 & 1 \\ j & -j \end{bmatrix} \times \begin{bmatrix} S_1 \\ S_2 \end{bmatrix} = \frac{1}{\sqrt{2}} \begin{bmatrix} S_1 + S_2 \\ jS_1 - jS_2 \end{bmatrix}.$$

Therefore, the modulation symbols $$T_{11} = \frac{(S_1 + S_2)}{\sqrt{2}} \text{ and} \quad \text{[Eqn. 5]}$$

$$T_{12} = \frac{(S_1 - S_2)}{\sqrt{2}} \quad \text{[Eqn. 6]}$$

will respectively be transmitted from antenna ANT1 and antenna ANT2 when pre-coding is done using pre-coding matrix $P_1$. Similarly, the modulation symbols $$T_{22} = \frac{(S_1 + jS_2)}{\sqrt{2}} \text{ and} \quad \text{[Eqn. 7]}$$

$$T_{21} = \frac{(S_1 - jS_2)}{\sqrt{2}} \quad \text{[Eqn. 8]}$$

will respectively be transmitted from antenna ANT1 and antenna ANT2 when pre-coding is done using pre-coding matrix $P_2$.

Figure 3B:
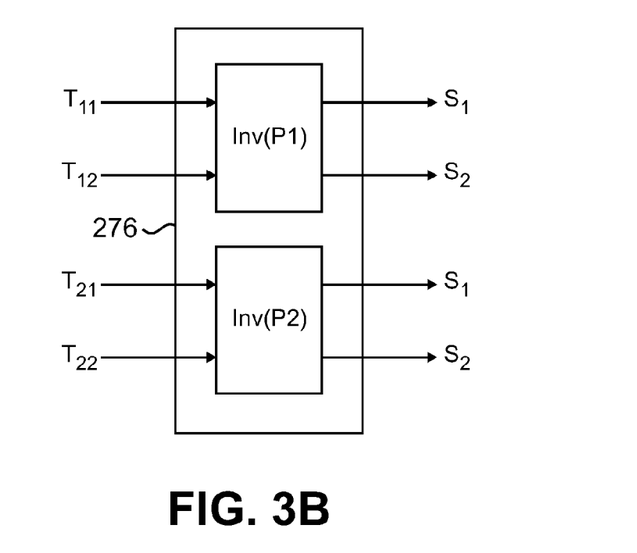
FIG. 3B illustrates an inverse pre-code block in greater detail according to one embodiment of the disclosure.

FIG. 3B illustrates inverse pre-code block 276 in greater detail according to one embodiment of the disclosure. In a pre-coded MIMO system, such as wireless network 100, inverse operations are performed in the receiver (e.g., SS 116) to recover the original symbols. The received pre-coded symbols $T_{11}$, $T_{12}$, $T_{21}$, and $T_{22}$, are multiplied by the inverse pre-coding matrices $inv(P_1)$ and $inv(P_2)$, as shown below:

$$inv(P_1) = \frac{1}{\sqrt{2}} \begin{bmatrix} 1 & 1 \\ 1 & -1 \end{bmatrix}, \quad [\text{Eqn. 8}]$$

$$inv(P_2) = \frac{1}{\sqrt{2}} \begin{bmatrix} 1 & -j \\ 1 & j \end{bmatrix}.$$

It should be noted that the inverse of a unitary pre-coding matrix may easily be obtained by taking the complex conjugate transpose of the pre-coding matrix. The transmitted symbols are decoded by multiplying the received symbol vector with the inverse pre-coding matrices as shown below:

$$\frac{1}{\sqrt{2}} \begin{bmatrix} 1 & 1 \\ 1 & -1 \end{bmatrix} \times \frac{1}{\sqrt{2}} \begin{bmatrix} S_1 + S_2 \\ S_1 - S_2 \end{bmatrix} = \begin{bmatrix} S_1 \\ S_2 \end{bmatrix}; \text{ and} \quad [\text{Eqn. 9}]$$

$$\frac{1}{\sqrt{2}} \begin{bmatrix} 1 & -j \\ 1 & j \end{bmatrix} \times \frac{1}{\sqrt{2}} \begin{bmatrix} S_1 + S_2 \\ S_1 - jS_2 \end{bmatrix} = \begin{bmatrix} S_1 \\ S_2 \end{bmatrix}. \quad [\text{Eqn. 10}]$$

In a conventional OFDM network, a total of 512 OFDM subcarriers may be divided into, for example, eight (8) subbands (or groups) labeled SB1 through SB8. Each one of subbands SB1-SB8 comprises sixty-four (64) subcarriers. In a conventional OFDM network, a given subscriber station may be allocated one or more of subbands SB1-SB8. In a single-user MIMO scheme, the space, time, and frequency resources in a given subband are allocated to a single subscriber station on all the virtual antennas. In a multi-user MIMO scheme, subscriber stations are multiplexed in space, with more than one subscriber station sharing the same OFDM subband, while using different virtual antennas.

U.S. patent application Ser. No. 11/389,708, entitled "System And Method For Subcarrier Allocation In A Multicarrier Wireless Network", filed on Mar. 27, 2006 by the inventors of the present disclosure, discloses a method of allocating subbands and antennas to multiple users (or subscriber stations) in a multi-user MIMO system. U.S. patent application Ser. No. 11/389,708 was fully incorporated by reference above.

In the case of a single-user MIMO spatial multiplexing transmission using OFDM in a conventional wireless network, a stream (or codeword) is transmitted over the same antenna or virtual antenna on all of the subbands allocated to the subscriber station. This results in poor performance because different subbands fade independently across the antennas resulting in symbol signal-to-interference and noise ratio (SINR) variations.

Figure 4:
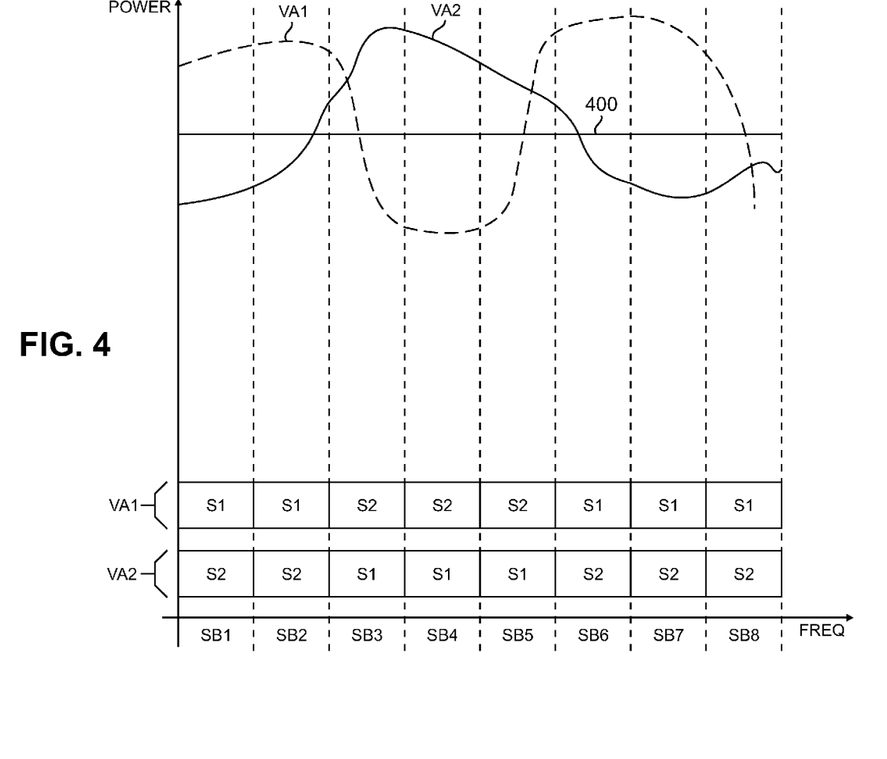
FIG. 4 illustrates the allocation of subbands in a base station according to the principles of the present disclosure.

FIG. 4 illustrates the allocation of subbands in base station 102 according to the principles of the present disclosure. The present disclosure introduces a novel scheme of space-frequency resource allocation. In the example shown, a first data stream S1 (e.g., Stream1 Data) is transmitted on the best available virtual antenna (VA) on a subband-by-subband basis. A second data stream S2 (e.g., Stream2 Data) uses the remaining virtual antenna on a subband-by-subband basis.

In FIG. 4, the dotted line, VA1, represents the frequency selective fading of a first virtual antenna (VA1) across subbands SB1-SB8 as seen in, and reported by, subscriber station (SS) 116. The solid line, VA2, represents the frequency selective fading of a second virtual antenna (VA2) across subbands SB1-SB8 as seen in, and reported by, subscriber station (SS) 116. Line 400 represents a flat fading characteristic.

As FIG. 4 indicates, SS 116 sees virtual antenna VA1 in an upfade with respect to line 400 in subbands SB1, SB2, SB6, SB7, and SB8 and sees virtual antenna VA1 in a downfade in subbands SB3, SB4, and SB5. Also, SS 116 sees virtual antenna VA2 in an downfade with respect to line 400 in subbands SB1, SB2, SB6, SB7, and SB8 and sees virtual antenna VA2 in an upfade in subbands SB3, SB4, and SB5.

Since Stream1 Data is transmitted on the best available virtual antenna for a given time-frequency resource, Stream1 Data (labeled S1 in FIG. 4) is transmitted on virtual antenna VA1 on subbands SB1, SB2, SB6, SB7, and SB8 and is transmitted on virtual antenna VA2 on subbands SB3, SB4 and SB5. Conversely, since Stream2 Data is transmitted on the remaining virtual antenna (i.e., not used by Stream1 Data) for a given time-frequency resource, Stream2 Data (labeled S2 in FIG. 4) is transmitted on virtual antenna VA2 on subbands SB1, SB2, SB6, SB7 and SB8 and on subbands SB3, SB4 and SB5 on virtual antenna VA1.

Figure 5:
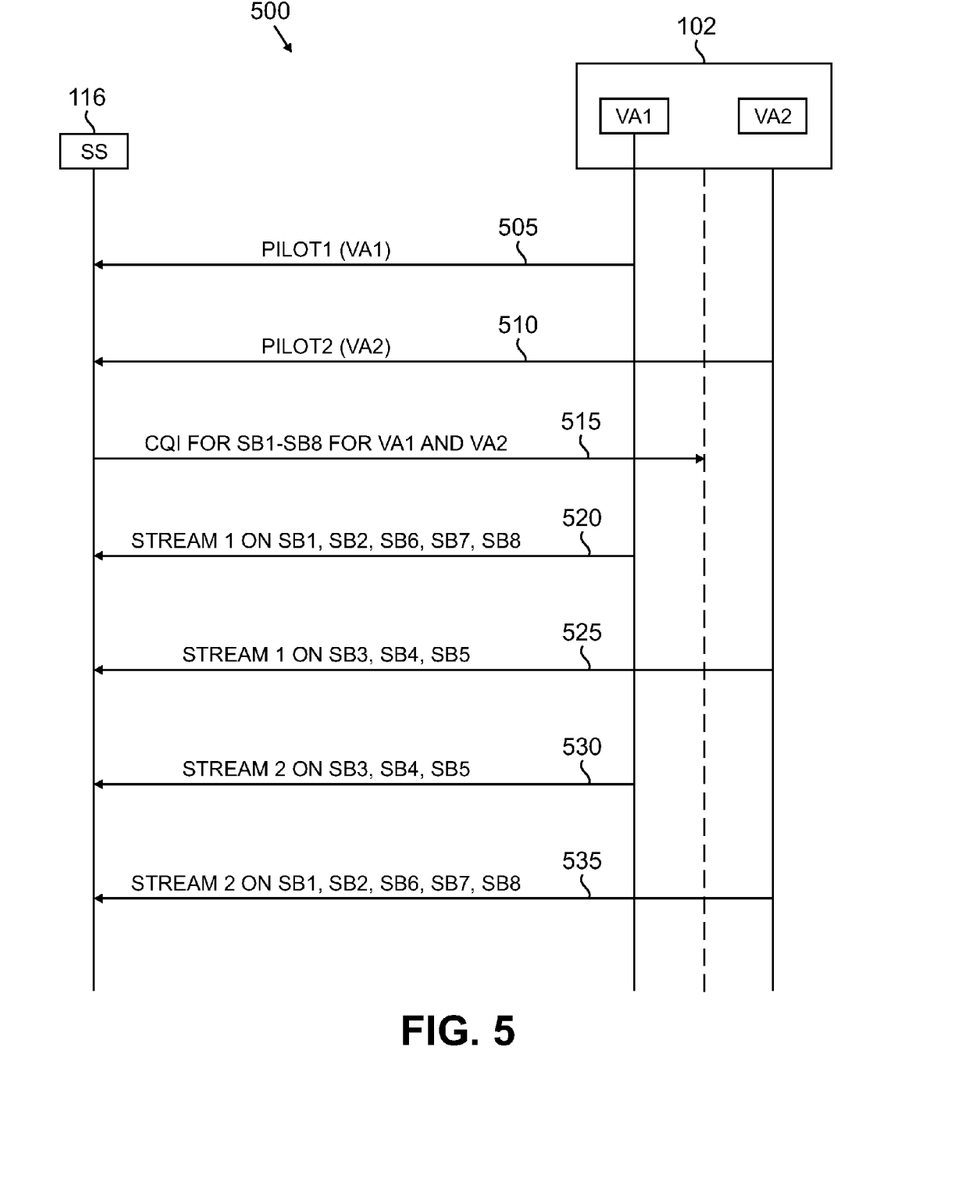
FIG. 5 is a message flow diagram illustrating the reporting by a subscriber station of channel quality indicator (CQI) values for the virtual antennas according to the principles of the present disclosure.

FIG. 5 depicts message flow diagram 500, which illustrates the reporting by subscriber station 116 of channel quality indicator (CQI) values for the virtual antennas according to the principles of the present disclosure. Initially, base station 102 transmits pilot signals from the virtual antennas VA1 and VA2 (messages 505 and 510). SS 116 reports back the Channel Quality Indication (CQI) values for each of the subbands SB1-SB8 for each virtual antenna (message 515). The channel quality may be measured based on the reference pilot signals transmitted in message 505 and 510 from each of the virtual antennas VA1 and VA2 by applying, for example the Minimum Mean Square Error (MMSE) algorithm or a similar algorithm.

Base station (BS) 102 allocates Stream1 Data and Stream2 Data to be transmitted on each of the subbands from each of the virtual antenna (VA) according to the channel quality observed for each of the subbands on each of the virtual antennas. For example, in subband SB1, Stream1 Data (or S1) is selected on virtual antenna VA1 and Stream2 Data (or S2) is selected on virtual antenna VA2. In subband SB1, channel quality is better on VA1 than on VA2 and the better quality space-frequency resources are allocated to Stream1 Data.

In the example in FIG. 5, BS 102 transmits Stream1 Data from virtual antenna VA1 on subbands SB1, SB2, SB6, SB7, and SB8 (message 520) and transmits Stream1 Data from virtual antenna VA2 on subbands SB3, SB4 and SB5 (message 525). BS 102 also transmits Stream2 Data from virtual antenna VA1 on subbands SB3, SB4 and SB5 (message 530) and transmits Stream2 Data from virtual antenna VA2 on subbands SB1, SB2, SB6, SB7, and SB8 (message 535). Advantageously, when BS 102 selects a higher channel quality virtual antenna for Stream1 Data on each of the subbands, BS 102 may also select a higher data transmission rate for Stream1 Data by using a higher order modulation technique and/or a higher coding rate in coding a modulation block 205a.

Figure 6:
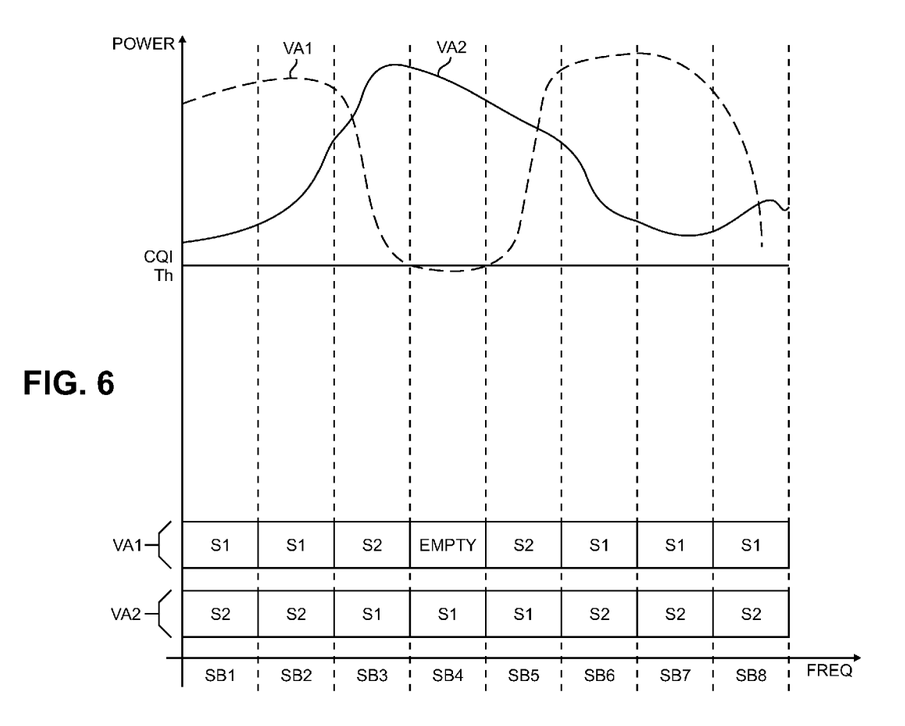
FIG. 6 illustrates the allocation of subbands in a base station according to another embodiment of the disclosure.

FIG. 6 illustrates the allocation of subbands in base station 102 according to another embodiment of the disclosure. In FIG. 6, BS 102 compares the reported CQI values of each subband for each virtual antenna to a pre-determined CQI threshold (CQI Th) and does not allocate for transmission any subband in which the space-frequency resource slot is below the predetermined threshold. A space-frequency resource slot comprises any combination of OFDM subband and virtual antenna. In FIG. 6, subband SB4 on virtual antenna VA1 is below the CQI Th line and is therefore not used for transmission (i.e., empty). The remaining subbands SB1-SB8 on virtual antennas VA1 and VA2 are used to transmit Stream1 Data (S1) and Stream2 Data (S2).

Figure 7:
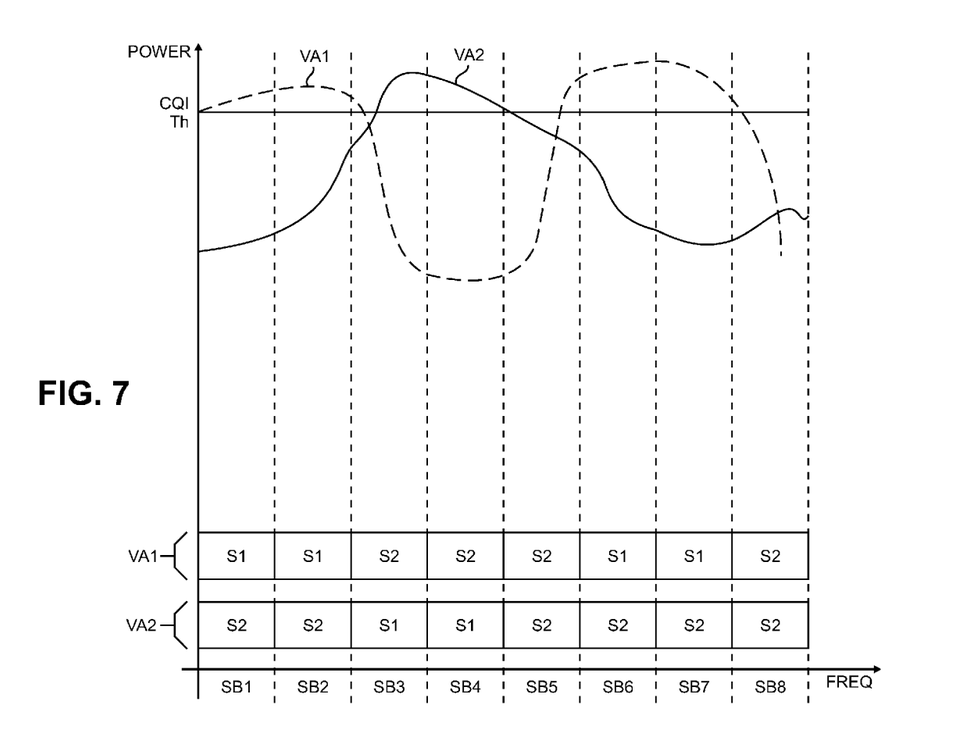
FIG. 7 illustrates the allocation of subbands in a base station according to still another embodiment of the disclosure.

FIG. 7 illustrates the allocation of subbands in base station 102 according to still another embodiment of the disclosure. In FIG. 7, the allocation of space-frequency resource slots between the streams is based on a CQI threshold. For example, space-frequency resource slots experiencing a channel quality above the CQI threshold (CQI Th) value are allocated to Stream1 Data (S1) and space-frequency resource slots experiencing a channel quality below the CQI Th value are allocated to Stream2 Data (S2). Thus, subbands SB1, SB2, SB6 and SB7 on virtual antenna VA1 and subbands SB3 and SB4 on virtual antenna VA2, which experience CQI values above the CQI Th value, are allocated to Stream1 Data (S1). The remaining space-frequency resource slots are below the CQI Th value and are allocated to Stream2 Data (S2).

Figure 8:
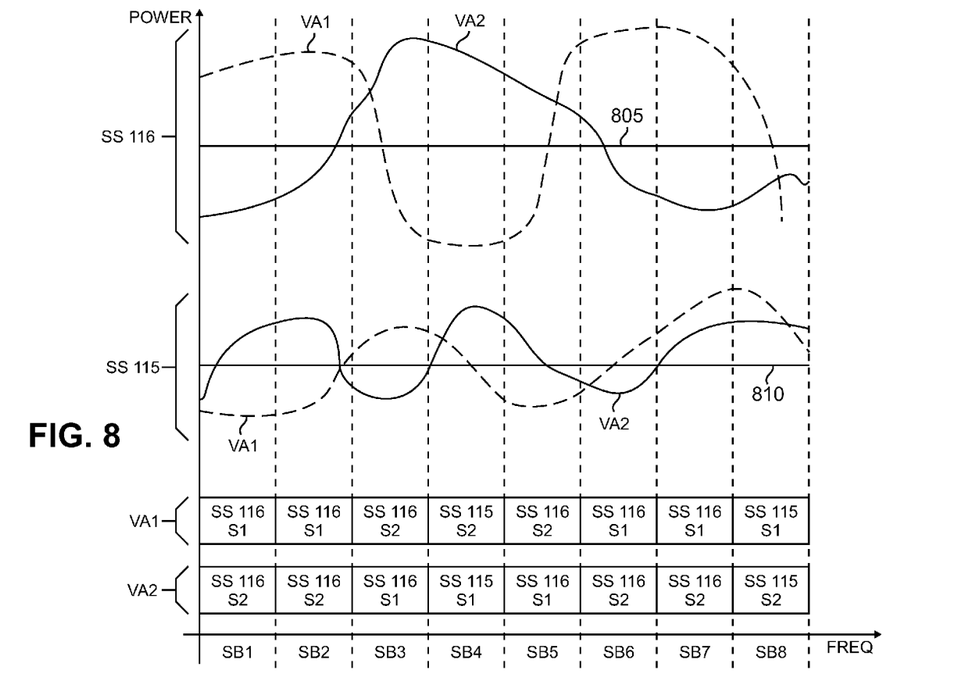
FIG. 8 illustrates the allocation of subbands between two subscriber stations in a base station according to one embodiment of the disclosure.

FIG. 8 illustrates the allocation of subbands between two subscriber stations in base station 102 according to one embodiment of the disclosure. In FIG. 8, two subscriber stations, SS 116 and SS 115, share the eight subbands SB1-SB8 on two virtual antennas VA1 and VA2. At the top of FIG. 8, the dotted line labeled VA1 shows the channel quality seen by SS 116 for virtual antenna VA1 across subbands SB1-SB8 with respect to line 805, which represents a flat fading response. The solid line labeled VA2 at the top of FIG. 8 shows the channel quality seen by SS 116 for virtual antenna VA2 across subbands SB1-SB8 with respect to line 805. In the middle of FIG. 8, the dotted line labeled VA1 shows the channel quality seen by SS 115 for virtual antenna VA1 across subbands SB1-SB8 with respect to line 810, which represents a flat fading response. The solid line labeled VA2 in the middle of FIG. 8 shows the channel quality seen by SS 115 for virtual antenna VA2 across subbands SB1-SB8 with respect to line 810.

The subbands SB1, SB2, SB3, SB5, SB6 and SB7 are allocated to SS 116 while subbands SB4 and SB8 are allocated to SS 115. Stream1 Data (S1) for SS 116 is transmitted on virtual antenna VA1 on subbands SB1, SB2, SB6, and SB7 and on virtual antenna VA2 on subbands SB3 and SB5. Stream2 Data (S2) for SS 116 is transmitted on virtual antenna VA1 on subbands SB3 and SB5 and on virtual antenna VA2 on subbands SB1, SB2, SB6 and SB7. Stream1 Data (S1) for SS 115 is transmitted on virtual antenna VA1 on subband SB8 and on virtual antenna VA2 for subband SB4. Stream2 Data (S2) for SS 115 is transmitted on virtual antenna VA1 on subband SB4 and on virtual antenna VA2 on subband SB8.

Figure 9:
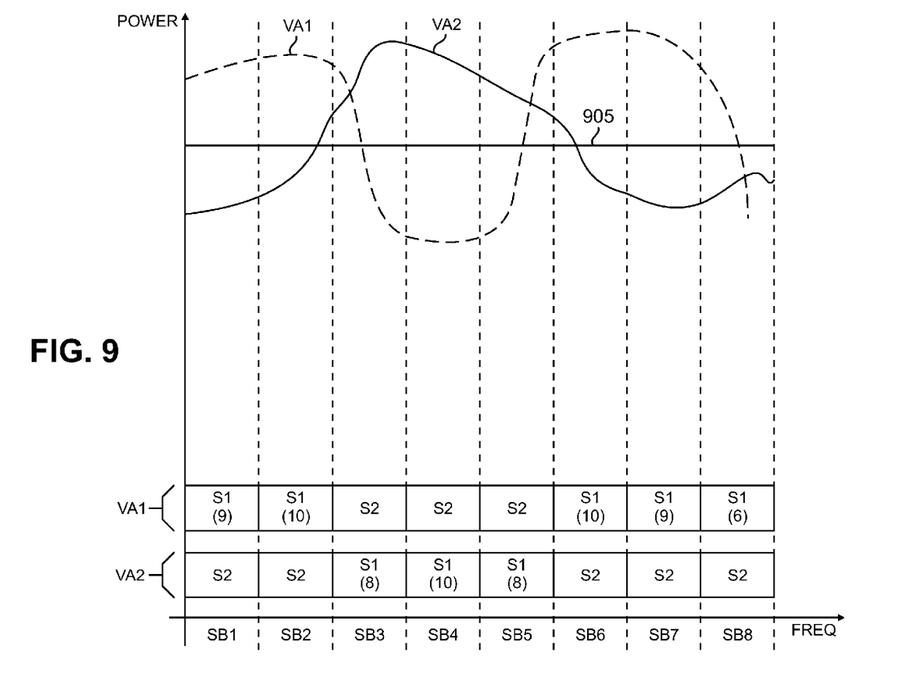
FIG. 9 illustrates the allocation of subbands in a base station according to a further embodiment of the disclosure.

FIG. 9 illustrates the allocation of subbands in base station 102 according to a further embodiment of the disclosure. In FIG. 15, the modulation and coding scheme for a given stream is selected based on the effective signal-to-interference and noise ratio (SINR) value. The effective SINR value is reported by the subscriber station as a channel quality indicator (CQI) value. In a Time Division Duplex (TDD) system, the SINR value may be measured by base station 102 based on the uplink pilot reception. The effective SINR value may be calculated based on methods such as Exponential Effective SINR Mapping (EESM) or effective SINR calculation based on a constrained capacity formula. In the method based on capacity formula, the average capacity is first calculated and then converted to the effective SINR value. The effective SINR value is calculated based on the space-frequency resource slots allocated to a data stream:

$$C_{avg} = \frac{1}{N} \cdot \sum_{i=1}^{N} \log_2(1 + SINR_i) \quad [\text{Eqn. 11}]$$

where N is the total number of space-frequency resource slots used for a stream and $SINR_i$ is the signal-to-interference and noise ratio (SINR) on the ith space-frequency resource slot. The average capacity is then converted to the effective SINR value as below:

$$SINR\text{eff} = 2^{C_{avg}} - 1. \quad [\text{Eqn. 12}]$$

In FIG. 9, the average SINR value within each space-frequency slot for Stream1 Data is shown in linear domain in parentheses. For example, the average SINR value is 9 for virtual antenna VA1 in subband SB1. The effective SINR values for Stream1 Data (S1), which is transmitted on virtual antenna VA1 on subbands SB1, SB2, SB6, SB7 and SB8 and on virtual antenna VA2 on subbands SB3, SB4 and SB5 is calculated by using the average SINR value per space-frequency resource slot. The SINR value per space-frequency resource slot is reported to BS 102 by SS 116 via the CQI message. The effective SINR for Stream1 Data (S1) is given below:

$$C_{avg} = \frac{1}{8} \cdot \begin{bmatrix} \log_2(1+9) + \log_2(1+10) + \\ \log_2(1+8) + \log_2(1+10) + \\ \log_2(1+8) + \log_2(1+10) + \\ \log_2(1+9) + \log_2(1+6) \end{bmatrix} = 3.27 \quad [\text{Eqn. 13}]$$

$$SINR_{eff} = 2^{3.27} - 1 = 8.65$$

The data rate or modulation and coding for Stream1 Data (S1) is then determined based on the effective SINR value. Similarly, the effective SINR value for Stream2 Data (S2) is calculated and a modulation and coding for Stream2 Data (S2) selected based on its effective SINR value.

Base station (BS) 102 may indicate the stream allocation to space-frequency resource slots via a bitmap signaling message. For example, an 8-bit bitmap signaling message may be used for eight subbands SB1-SB8 where all eight subbands are allocated to a single subscriber station. By way of example, for Stream1 Data (S1), a Logic 1 may be used to indicate virtual antenna VA1 and a Logic 0 may be used to indicate virtual antenna VA2. Thus, the 8-bit message field [11000111] indicates that Stream1 Data (S1) is transmitted on virtual antenna VA1 on subbands SB1, SB2, SB6, SB7 and SB8 and on virtual antenna VA2 on subbands SB3, SB4 and SB5.

This message field also indicates that the remaining space-frequency resource slots are allocated to Stream2 Data. SS 116 implicitly derives that Stream2 Data (S2) is transmitted on virtual antenna VA1 on subbands SB3, SB4 and SB5 and on virtual antenna VA2 on subbands SB1, SB2, SB6, SB7 and SB8.

Many of the details of the present disclosure have been explained for the case of two data streams and two transmit antennas. However, the scope of the present disclosure extends in a straightforward manner to cases of more than two data streams and more than two transmit antennas.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in an orthogonal frequency division multiplexing (OFDM) network capable of communicating with a plurality of subscriber stations in a coverage area of the OFDM network, a base station configured to transmit to a first subscriber station, using a first virtual antenna and a second virtual antenna, a first data stream and a second data stream, wherein the base station is configured to allocate first data symbols associated with the first data stream to be transmitted from the first virtual antenna in a first selected group of subbands of OFDM subcarriers and allocate second data symbols associated with the first data stream to be transmitted from the second virtual antenna in a second selected group of subbands of OFDM subcarriers different from the first selected group of subbands, wherein the base station further is configured to allocate third data symbols associated with the second stream to be transmitted from the first virtual antenna in a third selected group of subbands of OFDM subcarriers different from the first selected group of subbands.

2. The base station as set forth in claim 1, wherein the base station is configured to allocate the first data symbols associated with the first data stream to be transmitted from the first virtual antenna in the first selected group of subbands based on channel quality characteristics of the first selected group of subbands.

3. The base station as set forth in claim 2, wherein the base station is configured to allocate the second data symbols associated with the first data stream to be transmitted from the second virtual antenna in the second selected group of subbands based on channel quality characteristics of the second selected group of subbands.

4. The base station as set forth in claim 1, wherein the base station is configured to allocate the third data symbols associated with the second data stream to be transmitted from the first virtual antenna in the third selected group of subbands based on channel quality characteristics of the third selected group of subbands.

5. The base station as set forth in claim 4, wherein the base station further is configured to allocate fourth data symbols associated with the second stream to be transmitted from the second virtual antenna in a fourth selected group of subbands of OFDM subcarriers.

6. The base station as set forth in claim 5, wherein the base station is configured to allocate the fourth data symbols associated with the second data stream to be transmitted from the second virtual antenna in the fourth selected group of subbands based on channel quality characteristics of the fourth selected group of subbands.

7. The base station as set forth in claim 3, wherein the base station is configured to adapt at least one of a coding rate and a modulation type associated with the transmission of the first data symbols based on the channel quality characteristics of the first selected group of subbands.

8. The base station as set forth in claim 7, wherein the base station is configured to adapt at least one of a coding rate and a modulation type associated with the transmission of the second data symbols based on channel quality characteristics of the second selected group of subbands.

9. An orthogonal frequency division multiplexing (OFDM) network comprising a plurality of base stations capable of communicating with a plurality of subscriber stations in a coverage area of the OFDM network, each of the base stations configured to transmit to a first subscriber station, using a first virtual antenna and a second virtual antenna, a first data stream and a second data stream, wherein the each base station is configured to allocate first data symbols associated with the first data stream to be transmitted from the first virtual antenna in a first selected group of subbands of OFDM subcarriers and allocate second data symbols associated with the first data stream to be transmitted from the second virtual antenna in a second selected group of subbands of OFDM subcarriers different from the first selected group of subbands, wherein the base station further is configured to allocate third data symbols associated with the second stream to be transmitted from the first virtual antenna in a third selected group of subbands of OFDM subcarriers different from the first selected group of subbands.

10. The OFDM network as set forth in claim 9, wherein the each base station is configured to allocate the first data symbols associated with the first data stream to be transmitted from the first virtual antenna in the first selected group of subbands based on channel quality characteristics of the first selected group of subbands.

11. The OFDM network as set forth in claim 10, wherein the each base station is configured to allocate the second data symbols associated with the first data stream to be transmitted from the second virtual antenna in the second selected group of subbands based on channel quality characteristics of the second selected group of subbands.

12. The OFDM network as set forth in claim 9, wherein the each base station is configured to allocate the third data symbols associated with the second data stream to be transmitted from the first virtual antenna in the third selected group of subbands based on channel quality characteristics of the third selected group of subbands.

13. The OFDM network as set forth in claim 12, wherein the each base station further is configured to allocate fourth data symbols associated with the second stream to be transmitted from the second virtual antenna in a fourth selected group of subbands of OFDM subcarriers.

14. The OFDM network as set forth in claim 13, wherein the each base station is configured to allocate the fourth data symbols associated with the second data stream to be transmitted from the second virtual antenna in the fourth selected group of subbands based on channel quality characteristics of the fourth selected group of subbands.

15. The OFDM network as set forth in claim 11, wherein the each base station is configured to adapt at least one of a coding rate and a modulation type associated with the transmission of the first data symbols based on the channel quality characteristics of the first selected group of subbands.

16. The OFDM network as set forth in claim 15, wherein the each base station is configured to adapt at least one of a coding rate and a modulation type associated with the transmission of the second data symbols based on channel quality characteristics of the second selected group of subbands.

17. For use in base station of an orthogonal frequency division multiplexing (OFDM) network capable of communicating with a plurality of subscriber stations in a coverage area of the OFDM network, a method of transmitting a first data stream and a second data stream from the base station to a first subscriber station using a first virtual antenna and a second virtual antenna, the method comprising:

allocating first data symbols associated with the first data stream to be transmitted from the first virtual antenna in a first selected group of subbands of OFDM subcarriers;

allocating second data symbols associated with the first data stream to be transmitted from the second virtual antenna in a second selected group of subbands of OFDM-subcarriers different from the first selected group of subbands; and allocating third data symbols associated with the second stream to be transmitted from the first virtual antenna in a third selected group of subbands of OFDM subcarriers different from the first selected group of subbands.

18. The method as set forth in claim 17, wherein allocating the first data symbols associated with the first data stream to be transmitted from the first virtual antenna in the first selected group of subbands is based on channel quality characteristics of the first selected group of subbands.

19. The method as set forth in claim 18, wherein allocating the second data symbols associated with the first data stream to be transmitted from the second virtual antenna in the second selected group of subbands is based on channel quality characteristics of the second selected group of subbands.

20. The method as set forth in claim 17, wherein allocating the third data symbols associated with the second data stream to be transmitted from the first virtual antenna in the third selected group of subbands is based on channel quality characteristics of the third selected group of subbands.

21. The method as set forth in claim 20, further comprising allocating fourth data symbols associated with the second stream to be transmitted from the second virtual antenna in a fourth selected group of subbands of OFDM subcarriers.

22. The method as set forth in claim 21, wherein allocating the fourth data symbols associated with the second data stream to be transmitted from the second virtual antenna in the fourth selected group of subbands is based on channel quality characteristics of the fourth selected group of subbands.

23. The method as set forth in claim 19, wherein adapting at least one of a coding rate and a modulation type associated with the transmission of the first data symbols is based on the channel quality characteristics of the first selected group of subbands.

24. The method as set forth in claim 23, wherein adapting at least one of a coding rate and a modulation type associated with the transmission of the second data symbols is based on channel quality characteristics of the second selected group of subbands.

* * * * *